P. E. YOUNG.
PERCENTAGE BALANCE.
APPLICATION FILED DEC. 16, 1914.
1,243,790.
Patented Oct. 23, 1917.
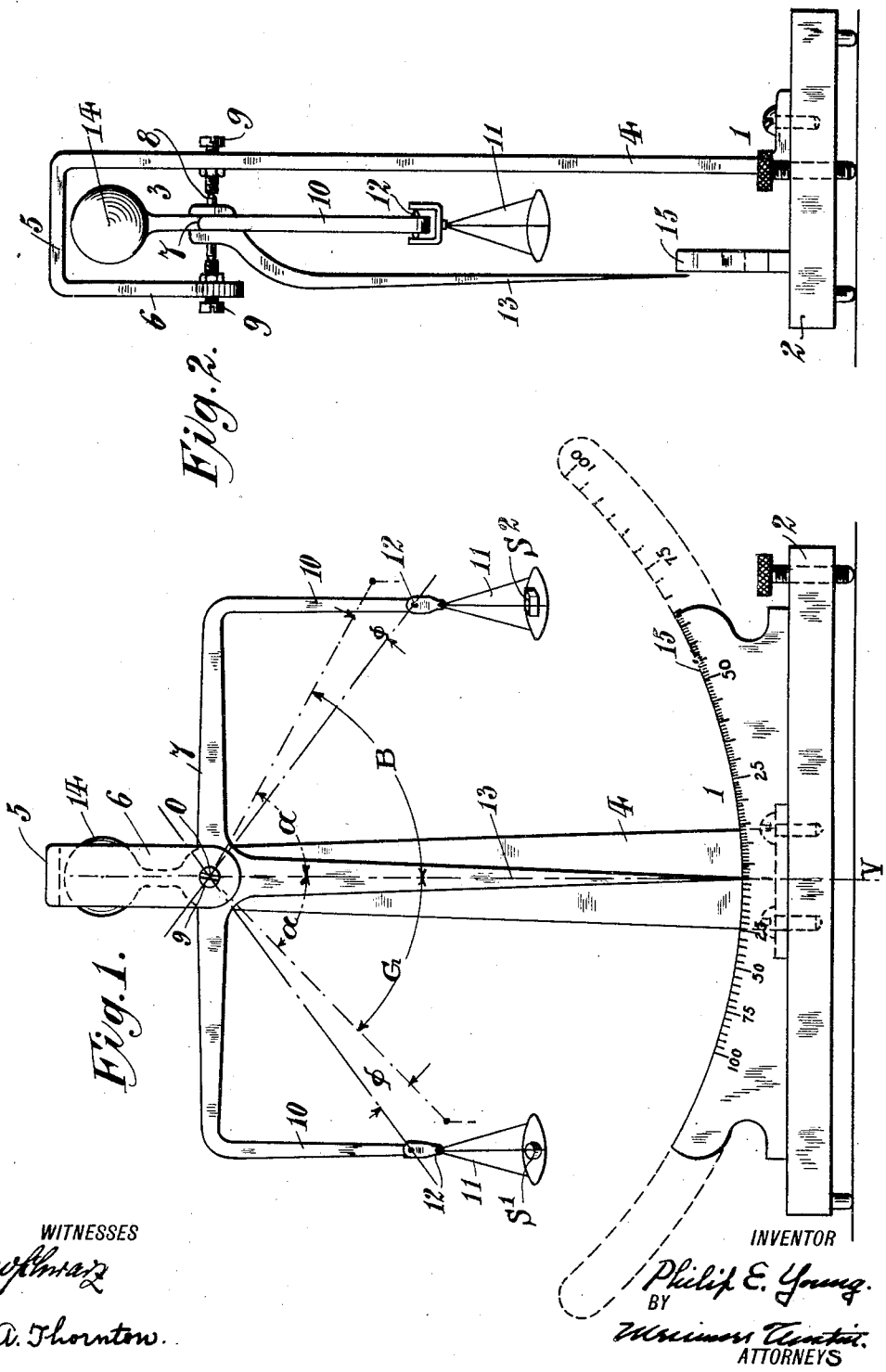

UNITED STATES PATENT OFFICE.

PHILIP E. YOUNG, OF FAIRHAVEN, MASSACHUSETTS.

PERCENTAGE-BALANCE.

1,243,790.　　　　　Specification of Letters Patent.　　Patented Oct. 23, 1917.

Application filed December 16, 1914. Serial No. 877,460.

*To all whom it may concern:*

Be it known that I, PHILIP E. YOUNG, a citizen of the United States, and resident of Fairhaven, in the county of Bristol and State of Massachusetts, have invented certain new and useful Improvements in Percentage-Balances, of which the following is a specification.

My invention relates in general to improvements in instruments for determining relative masses of different bodies by the direct weighing method and particularly relates to such an instrument designed for use where the fractional weights of different ingredients in a compound with reference to the aggregate weight of the compound must be determined quickly and accurately.

One of the objects of the invention is to provide such an instrument for indicating directly on a suitably graduated scale the relative weight of the body with reference to some unit mass with but one balancing operation and without resort to mathematical computations.

Incidental to this object the invention provides for the direct reading of the relative weights in percentages of either weight with the other weight as unity.

Another object of the invention is to provide a device of the above indicated character, which while retaining all of the advantages of a compact and sensitive balance, also provides for a refined and minute subdivision of the graduated scale spread over a long run.

One means of obtaining these objects is to provide an equal arm balance fulcrumed at its center of gravity and provided with a relatively long pointer movable over a quadrant scale of relatively large radius graduated in numerical values indicating fractional weights of a body with reference to a standard weight and in the illustrated embodiment, indicating percentages of this standard weight with the percentage marks so spaced that the pointer will swing through an angle which will indicate how much heavier or lighter the body is than the standard weight.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1 is a front elevation of an instrument disclosing a preferred embodiment of my invention having superimposed thereon an explanatory diagram illustrating the mathematics of the device; and Fig. 2 is an end elevation of the device shown in Fig. 1.

The instrument illustrated is an equal arm balance including a frame 1 comprising a broad and preferably heavy base plate 2 fixed to which is a support 3 formed of an upright 4 the upper end of which is bent forwardly to form a bracket 5 for carrying the depending supporting face plate 6. The support carries a balancing system which includes a beam 7 pivotally mounted between the upright 4 and face plate 6 and free to oscillate in a vertical plane. The beam is mounted on a pivot pin 8 journaled in end bearings 9 threaded through the upright and face plate. The pivot pin provides the fulcrum $o$ for the balance and passes through the center of gravity of the system. The beam comprises a pair of balance arms projecting on opposite sides of the fulcrum with the outer end of each arm formed into a depending portion 10. A weight pan 11 is swingingly supported on pivots 12 extending transversely of the depending portions 10, which pivots may be considered as the point of application of the weight forces acting on the system. These pivotal points are arranged L-units of distance from the fulcrum $o$. The lines connecting these points are constant in length irrespective of the angular position of the balance when in operation and form an angle $\alpha$ with the line V-passing vertically through the fulcrum when the system is balanced. A pointer 13 extends radially from the fulcrum to indicate the angle of movement of the system and is made relatively long so as to magnify this movement. In the embodiment of the invention herein illustrated the pointer is integral with the beam, depends therefrom at right angles to the axis of oscillation and forms an element of the balancing system.

A counterbalancing weight in the form of a ball 14 is affixed to the beam on the side thereof opposite the pointer to raise the center of gravity of the system so that the axis of rotation of the system will pass through the center of gravity of this system. The extreme end of the pointer is arranged to move over a suitably curved scale 15 which scale is disposed on one or both sides of that position which the pointer will assume when both arms of the beam are subjected to equal balancing forces. The scale is in the form of a quadrant with its lower portion affixed to the base and arranged so as to extend substantially in the plane of movement of the pointer and in a curve about the fulcrum as a center. The scale is provided with a zero mark positioned thereon opposite the position assumed by the pointer when the two arms of the beam are equally weighted and preferably disposed in a line directly below the fulcrum.

The scale is graduated from the zero mark in each direction of movement of the pointer therefrom in terms expressing fractional parts of one of the weights acting on the beam with the other weight considered as unity. Preferably these fractions are expressed as percentages and the graduations are so spaced on one side of the zero mark that the pointer in swinging to any value M passes over an angle equal to $$\cot^{-1}\left(\frac{1+\frac{200}{M}}{\tan \alpha}\right)$$

and in swinging to a value M on the other side of the zero mark passes over an angle $$\cot^{-1}\left(\frac{1-\frac{200}{M}}{\tan \alpha}\right)$$

The minus sign is used where the compared weight is less than the standard weight and the plus sign is used where the compared weight is heavier than the standard weight.

In operation the instrument is placed on a firm support and set by leveling the base until the pointer is opposite the zero mark on the scale. A standard weight $S_1$ is placed in one of the pans and a second weight or body $S_2$ to be compared to the standard weight is placed in the other pan. The weight $S_1$ may be a unit weight of some system of weighing, such for instance as 1 gram or 1 pound or it may be a weight indicating 100% of the composition, the ingredients of which are to be weighed. The heavier weight will cause the pointer to swing through an angle $\phi$ over an arc on the scale to a position indicating the percentage difference in weight between the body which is weighed and the standard weight. The two arms will rest in a position of balanced equilibrium in which the arm carrying the weight $S_1$ will form an angle with the vertical line V through the fulcrum which may be indicated as G angular units and the similar angle formed by the arm carrying the weight $S_2$ may be indicated as B angular units. These values on the scale indicate percentage differences in weights between the weighed body and the standard weight as will be noted by reference to the diagram on Fig. 1:

$B = \alpha + \phi$ where $S_2$ is less than $S_1$
$B = \alpha - \phi$ where $S_2$ is greater than $S_1$
$G = \alpha - \phi$ where $S_2$ is less than $S_1$
$G = \alpha + \phi$ where $S_2$ is greater than $S_1$ First when $S_2$ is greater than $S_1$ $$S_2 X = S_1 Y,$$

but $$X = L \sin B$$
$$Y = L \sin G$$

X and Y being respectively the distances of the masses $S_2$ and $S_1$ from the vertical line passing through the fulcrum.

Therefore $$S_2 \sin B = S_1 \sin G$$

or $$\frac{S_2}{S_1} = \frac{\sin G}{\sin B}$$

and $$\left(\frac{S_2}{S_1} - S_1\right)100 = \% \text{ increase} = M$$

substituting $$\frac{S_2}{S_1} = \frac{\sin G}{\sin B}$$

in above $$\left(\frac{\sin G}{\sin B} - 1\right)100 = M$$

$$\frac{\sin G}{\sin B} = \frac{M}{100} + 1$$

and $$B = \alpha - \phi$$
$$G = \alpha + \phi$$

where $\phi$ equals angle of motion.

Therefore $$\frac{\sin G - \sin B}{\sin B} = \frac{M}{100}$$

clearing fractions and simplifying $$\frac{2 \cos \alpha \sin \phi}{\sin \alpha \cos \phi - \cos \alpha \sin \phi} = \frac{M}{100}$$

or $$\frac{200}{M} = \tan \alpha \cot \phi - 1$$

$$\tan \alpha \cot \phi = 1 + \frac{200}{M}$$

as $\alpha$ is constant $$\cot \phi = \left(\frac{1 + \frac{200}{M}}{\tan \alpha}\right)$$

Secondly where $S_2$ is less than $S_1$ $$B = \alpha + \phi$$
$$G = \alpha - \phi$$

$$S_2 X = SY \qquad \frac{S_2}{S_1} = \frac{\sin G}{\sin B}$$

$$\left(\frac{S_1 - S_2}{S_1}\right)100 = \left(\frac{1 - S_2}{S_1}\right)100 = \% \text{ decrease} = M$$

$$\left(1 - \frac{\sin G}{\sin B}\right)100 = M = \left(\frac{\sin B - \sin G}{\sin B}\right)100 =$$

$$100\left(\frac{\sin \alpha \cos \phi + \cos \alpha \sin \phi - \sin \alpha \cos \phi + \cos \alpha \sin \phi}{\sin \alpha \cos \phi + \cos \alpha \sin \phi}\right)$$

$$\therefore \frac{2 \cos \alpha \sin \phi}{\sin \alpha \cos \phi + \cos \alpha \sin \phi} = \frac{M}{100}$$

or $$\tan \alpha \cot \phi + 1 = \frac{200}{M}$$

$$\cot \phi = \left(\frac{\frac{200}{M} - 1}{\tan \alpha}\right)$$

where $\phi$ is angle of motion of pointer from vertical position. Therefore when $S_2$ is greater than $S_1$.

$$\phi = \cot^{-1}\left(\frac{1 + \frac{200}{M}}{\tan \alpha}\right)$$

And when $S_2$ is less than $S_1$ $$\phi = \cot^{-1}\left(\frac{\frac{200}{M} - 1}{\tan \phi}\right)$$

By means of a device of this character it is prossible to read directly on the scale the relative weights of two bodies with but one operation which thus eliminates a source of error inherent in multiplicity of weighings. The readings may be made extremely accurate by minimizing friction at the fulcrum, in any manner usual with devices of this character, and in prolonging the length of the pointer so that it moves over a micrometrically graduated scale. An instrument of this character is particularly valuable in weighing out the constituents of a compound as in preparing chemical prescriptions. The different ingredients may be added one after the other to the body pan of the balance with the pointer registering the percentage sums of the different ingredients, until the entire 100% is added to the body pan.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A percentage balance for use in determining the relative weights of two bodies, comprising an equal arm beam, a pointer controlled by the movement of said beam, one of said arms having means for supporting a weight therefrom at a point of application, the other of said arms having means for supporting a body to be compared with the weight, said beam being fulcrumed at its center of gravity, a scale for said pointer, said scale having a zero mark thereon opposite the position assumed by the pointer when the arms of the beam are equally weighted, and in normal position, said scale being graduated in progressively increasing numerical values from the zero mark in the direction of movement of the pointer when the arms of the beam are unequally weighted, said values indicating percentages of one of the bodies compared with the other, said pointer in its movement to any value M on the scale passing over an angle equal to the expression $$\cot^{-1}\left(\frac{1+\frac{200}{M}}{\tan \alpha}\right)$$

and $\alpha$ is the angle between the vertical line through the fulcrum and the line passing through the fulcrum and through the point of application of one of the weights on the beam.

2. A percentage balance for use in determining the relative weights of two bodies, comprising an equal arm beam, fulcrumed at its center of gravity, said beam having means for supporting the two bodies on opposite sides of the fulcrum and equidistant from the vertical line passing through the fulcrum, said beam having an angular movement from its normal position under the action of the overbalancing effect of the heavier of said weights, the angle of movement of the beam being equal to the expression $$\cot^{-1}\left(\frac{1+\frac{200}{M}}{\tan \alpha}\right)$$

where M is percentage variation from one of the weights and $\alpha$ is the angle between the vertical passing through the fulcrum and the line passing through the fulcrum and through the point of application of the weights on the arms of the beam.

3. A device of the class described, comprising a balancing beam fulcrumed at its center of gravity, means for suspending unequal weights from adjacent opposite ends of said beam below the fulcrum and equally spaced from the vertical passing through the beam fulcrum when the beam is horizontal whereby the overbalancing effect of the heavier of said weights will cause the beam to move over an angle proportionate to the overbalancing effect and means including a pointer depending from the fulcrum of the beam for measuring this angle in percentage terms of one of said weights.

4. A device of the class described comprising a balancing beam, fulcrumed at its center of gravity, means for supporting weights from said beam on opposite sides of its fulcrum below the same and equally spaced therefrom and from the vertical passing through the fulcrum when the beam, is horizontal and means for measuring the angular displacement of said beam in terms of a proportion of one of the weights compared with the other when subjected to the action of unequal weights.

5. A device of the class described, comprising a balancing beam, means for supporting a standard mass from one of said arms, means for supporting a compared mass from the other arm with said masses disposed below the fulcrum of the beam, said beam and supporting means fulcrumed at the center of gravity of the same, and said beam having an angular movement under the action of the overbalancing effect of the heavier of said weights into a position of stable equilibrium and means including a scale graduated in percentage terms for measuring this angular movement in fractional terms of said standard arm.

6. A device of the class described, comprising an equal arm balancing beam adapted to have forces applied to each arm thereof below the fulcrum of the beam, said beam having a pointer extending from the fulcrum thereof for indicating the angle of movement of the beam when affected by an overbalancing force on one of the arms, a scale for said pointer indicating the angle of movement of the beam in terms expressing the proportion of the force acting on one of the arms in terms of the force acting on the other arm.

PHILIP E. YOUNG.

Witnesses:
CHAS. E. JACOBS,
CHAS. A. DAMON.